United States Patent

Bennett

[15] 3,648,014
[45] Mar. 7, 1972

[54] METHOD OF JOINING COPPER BRAID TO ALUMINUM AND THE JOINT FORMED THEREBY

[72] Inventor: Moreland P. Bennett, Pittsfield, Mass.
[73] Assignee: General Electric Company
[22] Filed: July 15, 1969
[21] Appl. No.: 841,947

[52] U.S. Cl. .................................................. 219/118
[51] Int. Cl. ............................... B23k 9/00, B23k 11/16
[58] Field of Search ........................................ 219/117, 118

[56] References Cited

UNITED STATES PATENTS 3,368,059  2/1968  Scott et al. ............................. 219/118
2,790,656  4/1957  Cook ................................. 219/118 X Primary Examiner—J. V. Truhe
Assistant Examiner—Hugh D. Jaeger
Attorney—Francis X. Doyle, Vale P. Myles, Frank L. Neuhauser, Oscar B. Waddell and Joseph B. Forman

[57] ABSTRACT

A copper braid is joined to an aluminum member by first tinplating the copper braid and then clamping the copper braid and the aluminum member between resistance-welding electrodes. Heat and pressure are then applied to bond the small copper wires of the braid to the aluminum and to extrude the aluminum between the strands of the copper braid.

2 Claims, 3 Drawing Figures

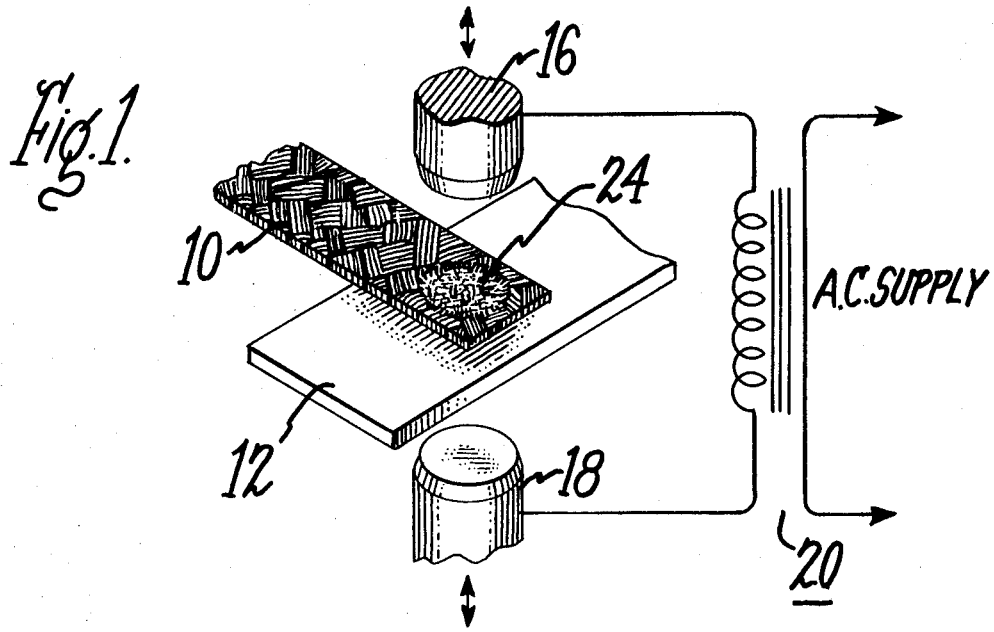
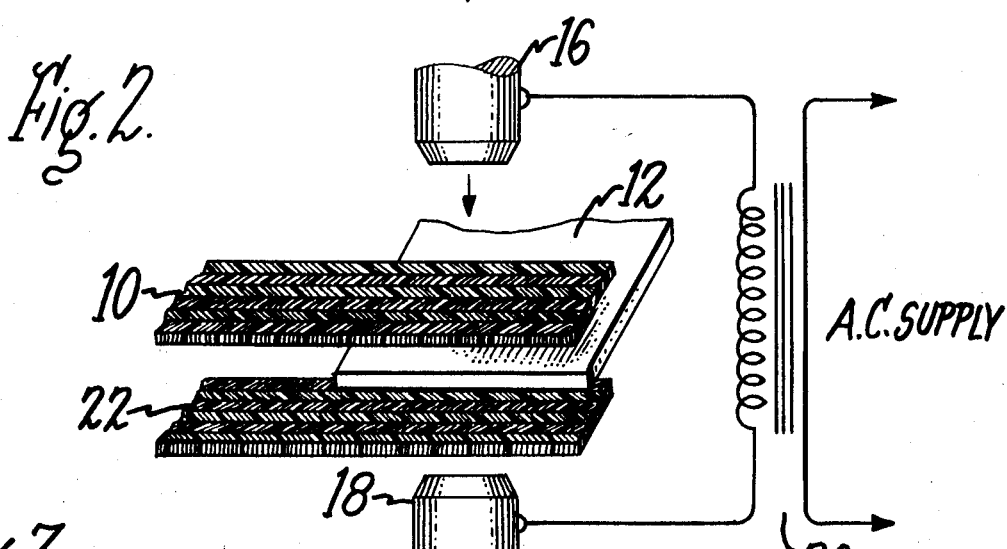
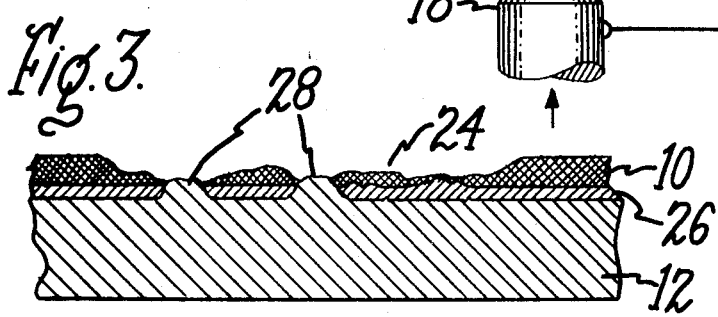
Inventor,
Moreland P. Bennett,
by Francis K. Doyle
His Attorney.

METHOD OF JOINING COPPER BRAID TO ALUMINUM AND THE JOINT FORMED THEREBY

BACKGROUND OF THE INVENTION

This invention relates to joints between copper and aluminum and more particularly to a method of joining a copper braid to an aluminum member and the joint formed thereby.

The problems inherent in forming a joint between aluminum and copper are well known to those skilled in the art. Copper, for example, does not form a good eutectic bond with aluminum. The joints usually formed are unsatisfactory particularly for electrical applications since such joints have high electrical resistance. Further, in most prior methods the joints so formed have been marked by very weak mechanical properties.

Recently in the electrical apparatus field the use of aluminum strip winding to form coils has become widely used throughout the industry. This has led to a requirement for finding a more advantageous way of joining aluminum to copper. This has become necessary due to the use of leads and crossovers of copper metal that are often considered desirable when using aluminum strip windings.

It has recently been disclosed in U.S. Pat. No. 3,310,388 that bonds between dissimilar metals such as aluminum and copper can be made by the use of a silver brazing alloy in apertures in the aluminum member with the copper on opposite sides of the aluminum. A brazing heat melts the alloy and forms a strong low-resistance bond between the members of the sandwich structure.

While this bond provides a good electrical and mechanical joint between the members, it has been considered desirable to obtain a secure electrical connection between copper and aluminum without the use of a sandwich type of structure. Further, it is considered desirable to make such joints without the need to specially prepare the members to be joined.

It has recently been discovered that a secure mechanical and electrical joint can be formed between an aluminum member and a braided copper wire or terminal by the application of heat and pressure to the members to be joined.

It is, therefore, one object of this invention to provide a novel method of joining copper to aluminum.

Another object of this invention is to provide a novel joint between copper and aluminum.

A still further object of this invention is to provide a novel joint using a copper braided member joined to an aluminum member.

SUMMARY OF THE INVENTION

Briefly in one form this invention comprises a method of joining copper to aluminum. The copper is in the form of a braided member of small copper wires and it is firmly clamped to an aluminum member by resistance electrodes. Heat and pressure applied to bond the small copper wires to the aluminum and to extrude the aluminum between the strands of the copper braid. The invention also comprises a joint which is made by such method.

The invention which is sought to be protected will be particularly pointed out and distinctly claimed in the claims appended hereto. However, it is believed that this invention and the manner in which its various objects and advantages are obtained as well as other objects and advantages thereof will be better understood by reference to the following detailed description of a preferred embodiment especially when considered in the light of the accompanying drawing.

BRIEF DESCRIPTION OF DRAWING

FIG. 1 is a perspective view of the preferred method of this invention of joining a copper braided member to an aluminum member;

FIG. 2 is a perspective view showing the preferred method of joining a pair of copper braided members to an aluminum member, and FIG. 3 is a sectional view through the joint formed by the method of FIG. 1.

DESCRIPTION OF PREFERRED EMBODIMENT

In accordance with this invention, a copper-braided member formed of small copper wires is tin-plated and bonded to an aluminum member by heat and pressure. The drawing shows the present preferred embodiment of forming such joint. Reference will now be made thereto wherein like numerals are used to indicate like parts throughout the various views for a more complete description of the method and joint.

Referring to FIG. 1 there is shown a copper-braided member 10 formed of a plurality of fine copper wires. In the preferred form, the copper braid is tin-plated. The copper braid may be, for example, a braided copper terminal for an electrical device. An end of the copper braid 10 is placed in overlapping relation with a portion of an aluminum member 12 such as, for example, the end of an aluminum strip winding. A pair of resistance electrodes 16 and 18 are brought into contact with the overlapping areas and clamped together. Electrodes 16 and 18 are connected to the secondary of a transformer 20 to provide resistance-heating of the overlapped members 10 and 12. Heat and pressure are applied by electrodes 16 and 18 which will cause the small copper wires of braid 10 to break down any oxide coating on the surface of the aluminum member 12. The heat will also bond the contacting wires of braid 10 to the surface of the aluminum member 12 and will also extrude the aluminum between the strands of the copper braid 10.

In one example, according to this invention, a tin-plated copper braid 0.085 inch by 0.750 inch was attached to a pair of aluminum wires 0.125 inch by 0.215 inch which were in side-by-side relation. A pair of 1 inch carbon electrodes were brought in contact with the braid and with the pair of aluminum wires using an electrode force of 500 pounds. A secondary current of 6,500 amperes was applied for approximately 6 seconds. The current was applied until the aluminum appeared between the strands of the braid. Samples made according to this example were tested both electrically and mechanically and showed that the joint provided a satisfactory connection of a tap lead to aluminum wire.

FIG. 2 shows a method of joining a pair of copper braids to a single aluminum member. This may be for example the opposite sides of a braided copper terminal while the aluminum strip may be the end of a coil winding. In this figure, the braids 10 and 22 are placed on opposite sides of the aluminum member 12 and electrodes 16 and 18 are used to apply heat and pressure to firmly bond the copper braid 10 and 22 to aluminum member 12 in the manner previously described. FIG. 3 shows one example of a joint made by the method of FIG. 1. As shown, the copper braid 10 has been indented at 24 by electrodes 16. A fusion zone of tin, copper and aluminum is formed between the braid 10 and the aluminum 12 as is indicated at 26. Further, the aluminum of the aluminum member 12 has been extruded between the strands of the copper braid 10 as is indicated at 28.

Of course, it will be apparent from the description that a single piece of braid may be used as a transition member between an aluminum member and a solid copper member, such as a copper tap strap. Further, it will be clear that, when a plurality of copper members are to be connected to a single, thin aluminum member, such as a thin, wide aluminum coil strip, each of the braid members should be connected to the aluminum member to provide a secure mechanical and electrical connection without damaging the thin aluminum member.

While the above sets forth the present preferred embodiment of this invention, it will be apparent to those skilled in the metal-joining art that various changes may be made without departing from the spirit and scope of this invention.

What is claimed as new and which it is desired to secure by Letters Patent of the United States is:

1. A method of joining a copper braid to an aluminum member comprising the steps of
   a. providing a copper braided member,
   b. providing an aluminum member, c. placing a portion of said copper braided member in overlapping relation with said aluminum member, d. applying resistance heat and pressure through carbon electrodes to melt said aluminum and to bond contacting portions of said braid to said aluminum and to extrude said aluminum between the strands of said copper braid.

2. A method of joining a copper braid to an aluminum member as set forth in claim 1 in which said copper braid is tin-plated.

* * * * *